Patented Apr. 4, 1944

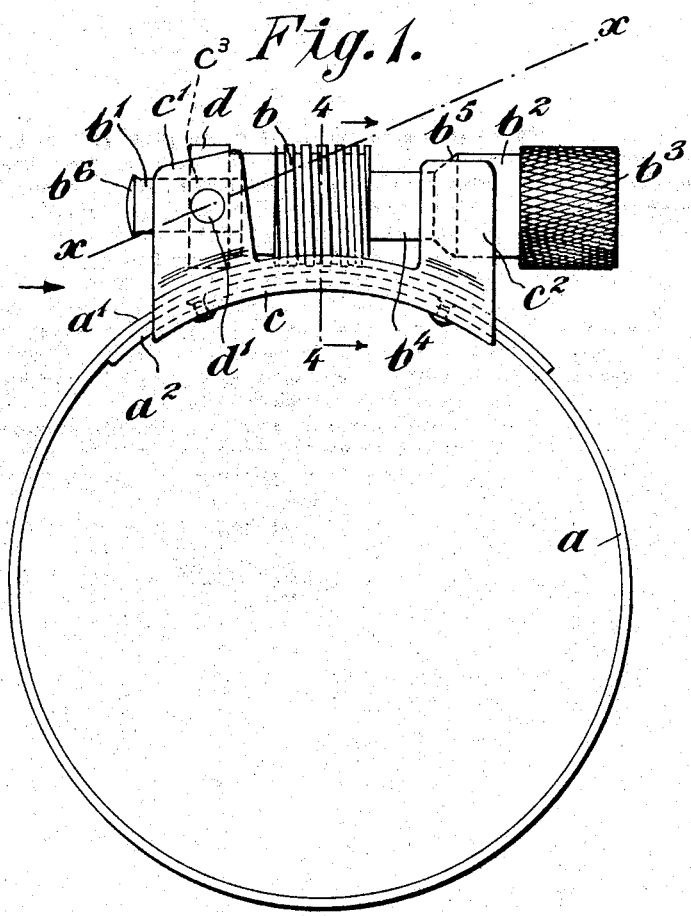
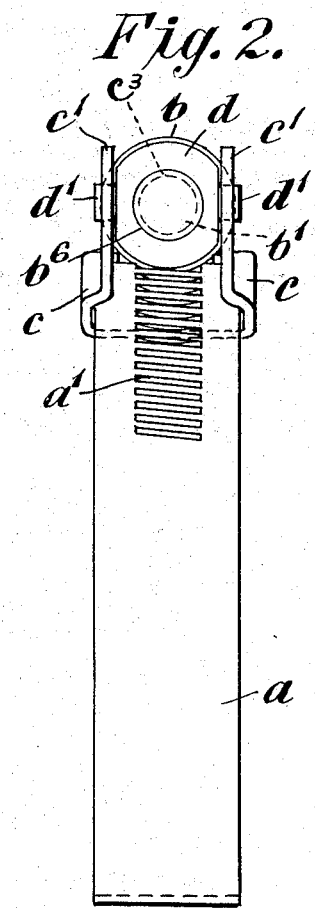
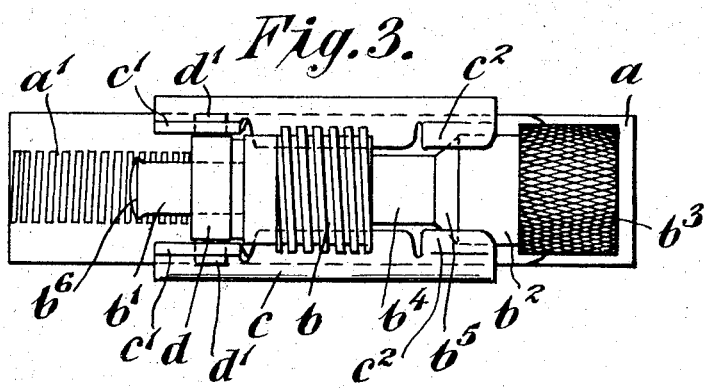
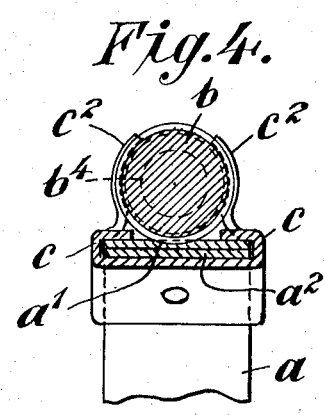

2,345,832

UNITED STATES PATENT OFFICE 2,345,832

HOSE OR BAND CLIP

Eric Thomas Pritchard, Liveredge Hill, Henley-in-Arden, England

Application April 10, 1943, Serial No. 482,560
In Great Britain April 1, 1942

2 Claims. (Cl. 24—19)

This invention has reference to improvements in hose or band clips of the kind generally utilised to connect a length of hose to a metallic tubular socket or the like, say for example the hose connection between a radiator and the water jacket or an engine cylinder.

The object of the invention is to incorporate a readily adaptable adjustment device with the clip so that the interengagement and setting of the free overlapping ends of the split clip shall be connected or disconnected at will and the invention is especially applicable to hose or band clips which incorporate on the periphery of one part of the clip a section of screw-thread, which thread section is adapted to be engaged by an adjusting screw to determine and fix the final diameter of the clip, the particular feature of the present invention being the improved method of mounting the adjusting screw so as to provide ready means for the initial setting of the diameter of the clip to approximate to the final setting, and to permit the final setting by the operation of the adjusting screw which has been brought into interengagement with the section of screw-thread peripherally formed on the clip.

The invention comprises a hose or band clip of the kind referred to incorporating a screw-threaded adjustment device and is characterised by the combination of a pivotal and slidable mounting for the adjustable coupling screw which is adapted to engage and interlock with the peripherally screw-threaded section of the clip.

The invention further resides in certain details of the arrangement and mounting of the said coupling screw and parts associated therewith as will hereinafter appear.

The invention will now be described with particular reference to the accompanying drawing, in which:

Figure 1 is a side elevation showing the clip and the parts associated therewith in the interlocked position.

Figure 2 is an end elevation looking in the direction of the arrow Figure 1.

Figure 3 is a plan of Figure 1.

Figure 4 is a sectional elevation on line 4—4 of Figure 1.

The drawing illustrates the application of the invention to a hose or band clip of a well-known kind in which the extremity of one part of the split band or clip $a$ is provided with a peripherally formed grooved or toothed section $a^1$ which takes the form of part of a square screw-thread. This part of the clip is adapted to be engaged and interlocked with the other free extremity $a^2$ of the band or clip $a$ through the medium of an adjustable screw $b$ mounted in a bracket $c$ on the free end $a^2$ of the band or clip. The particular feature of the present invention resides in the arrangement and method of mounting this adjustable coupling screw $b$. This screw instead of as ordinarily being mounted in a bracket which maintains the screw in what may be said to be permanent and continuous engagement with the section bearing the peripheral thread $a^1$, is pivotally and slidably mounted in an open topped or jawed bracket $c$ by means of a trunnion mounting $d$, the trunnion taking the form of a substantially rectangular nut or block which is pivotally located by means of a pair of opposed pins $a^1$ within circular apertures $c^3$ in a pair of upstanding jaws $c^1$ forming part of the bracket $c$. The reduced end $b^1$ of the shank of the screw $b$ is provided with a splayed end $b^6$ and is longitudinally slidable within this trunnion nut or block $d$ so that in addition to the screw $b$ being capable of a pivotal motion relative to the bracket $c$ about the axis of the trunnion pins $d^1$ the screw $b$ may have imparted thereto a longitudinal and rotational motion within the trunnion mounting. The enlarged shank section $b^2$ of the screw is adapted to be engaged within another pair of jaws $c^2$ inwardly curved at their upper ends and extending from the base of the bracket $c$, the base of the bracket $c$ being riveted to the end $a^2$ of the band or clip $a$. The head end of this section is furnished with a knurled knob $b^3$ to facilitate its rotation and manipulation.

The disposition and size of the various sections of the screw $b$ are such as to admit of the reduced part of the shank $b^4$ of the screw passing through the gap between the upper ends of the pair of jaws $c^2$, and when the enlarged shank section $b^2$ of the screw is slidably located therebetween the screw is positively held in interlocking engagement with part of the length of screw-thread $a^1$.

Desirably the interconnecting section between the parts of the shank $b^2$ and $b^4$ is formed with an annular tapered lead $b^5$ which will facilitate the sliding engagement of the section $b^2$ of the screw within the retaining jaws $c^2$.

It will be appreciated that in operation if the screw $b$ is released from engagement with the screw-thread $a^1$ by first withdrawing the screw so as to clear the enlarged shank portion $b^2$ from within the retaining jaws $c^2$ of the bracket $c$, that the screw can be raised or turned about its pivotal trunnion pin mounting $d^1$ as indicated by the dotted centreline designated $x$—$x$ in Figure 1, which will admit of the operator manipulating the split sections $a^1$ and $a^2$ of the band or clip $a$ so as to contract the diameter of the band or clip approximately to that of the final dimensions desired. While the band or clip is so held the screw $b$ is brought down by rocking the screw about its pivotal mounting into re-engagement with the thread $a^1$ of the band or clip $a$, and the final adjustment or tightening is effected by a rotational motion of the screw $b$ which is conveniently manipulated by means of the knurled head $b^3$. By this means a very rapid adjustment and connection of the two ends of the clip is effected with a considerable saving in time.

It will be appreciated that likewise a ready disassociation of the split overlapping sections $a^1$ and $a^2$ of the clip can be obtained by releasing the shank of the adjusting screw from between the retaining jaws $c^2$ of the bracket, then lifting the screw out of engagement with the toothed or grooved periphery $a^1$ of the clip when the ends will spring apart due to the inherent resilience obtaining in the split band or clip.

I claim:

1. A band clamp comprising, in combination, a split band having a bracket on one end, the other end of the band overlapping the first end and being provided with teeth on its periphery, a screw for engagement with said teeth mounted at one end on the bracket to move longitudinally and to pivot about an axis substantially parallel to the axis of the band, an enlarged head on the other end of the screw, and an overhanging portion on the bracket to engage said enlarged head and thereby lock the screw against pivoting when the screw is moved longitudinally into a position to apply tension to the band.

2. A band clamp comprising, in combination, a split band having a bracket on one end, the other end of the band overlapping the first end and being provided with teeth on its periphery, a screw for engagement with said teeth mounted at one end on the bracket to move longitudinally and to pivot about an axis substantially parallel to the axis of the band, an enlarged head on the other end of the screw, a pair of members extending from the sides of the bracket adjacent the base of said enlarged head, said members being separated by a space wide enough to permit the body of the screw to pass between them when the screw is pivoted into engagement with said teeth, but overhanging the enlarged head to lock the screw against pivoting when the screw is moved longitudinally into a position to apply tension to the band.

ERIC THOMAS PRITCHARD.